Sept. 4, 1928.

W. A. A. BURGESS

STARTING AND SYNCHRONIZING OF ALTERNATING CURRENT DYNAMO ELECTRIC MACHINES

Filed April 8, 1926   3 Sheets-Sheet 1

Sept. 4, 1928.

W. A. A. BURGESS 1,683,284

STARTING AND SYNCHRONIZING OF ALTERNATING CURRENT DYNAMO ELECTRIC MACHINES

Filed April 8, 1926    3 Sheets-Sheet 3

INVENTORS
By W. A. A. Burgess.
Watson, Coit, Morse + Grindle
ATTY.

Patented Sept. 4, 1928.

1,683,284

UNITED STATES PATENT OFFICE.

WILLIAM ANTHONY AMBROSE BURGESS, OF MONKSEATON, ENGLAND, ASSIGNOR TO A. REYROLLE & COMPANY LIMITED, OF HEBBURN-ON-TYNE, ENGLAND, A COMPANY OF GREAT BRITAIN.

STARTING AND SYNCHRONIZING OF ALTERNATING-CURRENT DYNAMO-ELECTRIC MACHINES.

Application filed April 8, 1926, Serial No. 100,700, and in Great Britain May 9, 1925.

This invention relates to the starting and synchronizing of alternating current dynamo-electric machines.

When starting synchonous alternating current dynamo-electrical machinery it is well known that the difference in phase between the supply voltage and that of the incoming machine produces a pulsation or "beat" voltage in the windings of apparatus connected between the two circuits or in circuits inductively coupled to both. This beat is at first rapid and gradually gets slower as the incoming machine approaches synchronism. Thus in the case of rotary converters arranged to start from the A. C. side either with or without auxiliary motors, the A. C. supply at full periodicity but usually at a reduced voltage is applied to the slip rings either direct or through the windings of a starting motor. As the brushes on the commutator are in a fixed position, there will be a pulsating voltage at full supply periodicity but comparatively small amplitude impressed on the brushes at the moment of switching in, and this periodicity will fall as the machine speeds up until at synchronism no pulsation will take place.

In order to protect the instruments commonly utilized to indicate synchronism, it has been proposed to connect first a less sensitive device to indicate the approach of synchronism and to connect the more sensitive device when there is less danger of damage to it.

Various devices have been employed in the nature of voltmeter relays and the like whereby the later stage has been indicated and circuits controlled so as to indicate the correct moment of synchronism and to perform the final switching operations necessary to throw the machine into full operation. Some of these devices have depended upon the amplitude of the beat as well as its rapidity. Again arrangements have been suggested whereby the operation of "starting" and "synchronizing" devices for rotary converters, motor converters and the like has depended upon the direct current polarity being right with respect to that of the supply.

The primary object of the present invention is to provide means whereby the starting and synchronizing of an A. C. machine at the right polarity shall be accomplished in a simple and sure way.

Figure 1:
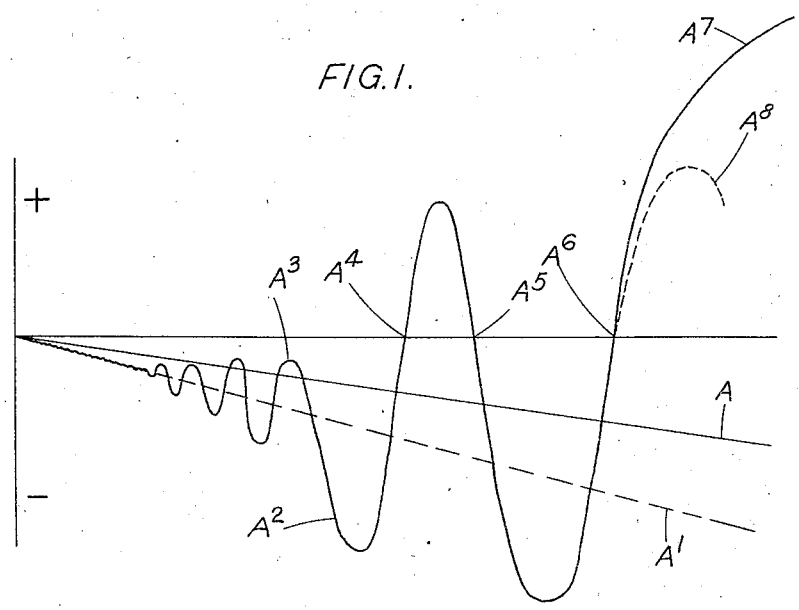

Further objects of the invention will be apparent from the following description of the accompanying drawings, and from the appended claims. In these drawings, Figure 1 is a graph illustrating the nature of the beat between the supply voltage and the voltage of the machine, and Figures 2-7 are diagrams respectively illustrating six alternative arrangements for carrying out the invention.

An important feature of the invention which is present in all the arrangements illustrated is the provision of a relay so constructed and arranged that when the beat between the supply voltage and the voltage of the machine is sufficiently slow, the field of the machine is altered so as to bring the machine into synchronism at the correct polarity. The relay is polarized or otherwise directionally biassed so that it will operate only for half of the beat or wave (or for those portions of the beat which have the same polarity), and it controls the field of the machine in some suitable manner, as for example by short-circuiting a resistance in series with the field magnet winding, or by introducing a series booster or a secondary battery in series with the main field winding or in an exciter field circuit, or by operating a switch arranged to complete the main or exciter field circuit or to alter the whole or a portion of the main or exciter field connections from series to parallel, or by reversing the main or exciter field connections.

This relay may be referred to as "field-biassing" or "field-controlling" relay, its primary function being, when the beat is sufficiently slow, to alter or bias the strength of the field or otherwise to cause the application or increase of a synchronizing force during each alternate half-beat or during such portions of the beat as have the same polarity. Thus the relay will alternately open and close its contacts at every change of polarity of the beat, each closing causing an alteration in the field which will strengthen the forces tending to pull the machine into synchronism. In actual practice, however, it will generally be unnecessary for the relay to operate more than once (or possibly twice), for the alteration of the field can usually be made such that after a single application of the relay the beat is so strongly affected that its polarity will not again change, with the result that the relay contacts will not open again.

In order that this field-controlling relay may only come into operation when the beat is sufficiently slow, damping means are provided either on the relay itself (e. g. in the form of a dash-pot, magnetic brake or air vane) or controlling the circuit to the operating coil of the relay. When the damping means are separate from the relay, they may take the form of a transformer, whose primary winding is connected in series with the operating coil of the relay, whilst its secondary winding is short-circuited and is so arranged as to prevent the flow of sufficient current to operate the relay until the beat frequency has fallen to the predetermined value. Alternatively the damping means may comprise a separate relay so constructed that it will not respond to beats at a frequency higher than those at which the field-controlling relay is required to operate. This second relay may be referred to as a "damped" relay, for it is preferably electrically damped by the provision of a closed auxiliary winding on or adjacent to the core and in such relation to the primary winding that currents induced in the closed winding by the primary winding will have the effect of preventing the attraction of the armature until the beat frequency has become sufficiently low. When this occurs the circuit of the field-controlling relay will be closed. The amount of damping provided on this relay may bear a definite relation to the time-lag of the field-controlling relay.

In the case of machines with a very small residual magnetic field, the pulsation or beat voltage will attain approximately equal amplitude on either side of a zero polarity line, but in a machine with an appreciable residual field a polarity bias is introduced in direct proportion to the residual field and to the speed of the machine. In the case of commutating machines, such for example as rotary converters, starting with brushes on the commutator and with the field circuit closed, this residual bias is further strengthened by the effect of the generated voltage on the field circuit.

The polarity of the residual magnetism may thus influence the polarity at which the machine pulls into synchronism, but the pulsating A. C. voltage, when nearing synchronism, usually is or can be made to be of sufficient amplitude to cross the zero polarity line. This is illustrated by the graph shown in Figure 1 of the accompanying drawings which is intended to indicate the general form of the pulsating voltage plotted against time in the case of a rotary converter. This graph is inserted in explanation only and does not necessarily correctly represent conditions for any particular machine. In this graph the straight line A represents the mean bias (assumed to be negative) due to the residual magnetism, whilst the dotted line $A^1$ indicates the extra negative bias produced by the generated voltage. The curve $A^2$ shows the resultant pulsation or beat voltage. It will be observed that the frequency of the beat falls, and the amplitude increases up to a point $A^3$ (at which the tappings in the starting circuit are changed over). A relatively large increase in amplitude now takes place with the result that the curve crosses the zero polarity line at $A^4$, the polarity of the beat remaining positive for a brief period to $A^5$. If the beat frequency falls to the critical value (which may be for example between one and five per cent of the initial frequency), say, shortly after the point $A^5$, the field-controlling relay will be operated at $A^6$ after the curve next crosses the zero line (assuming that it is intended to synchronize with positive polarity). The action of the relay according to the invention causes a strong positive bias to be applied, as a result of which the machine rapidly pulls into synchronism and the curve moves up as at $A^7$ to the steady D. C. voltage value without again crossing the zero line. The dotted line $A^8$ indicates the course the curve would have taken if the relay had not operated. If the arrangement is such that only a small alteration is caused in the field circuit by the operation of the relay, the curve would not at once move up to the steady D. C. voltage value but would again cross the zero line. The relay would then open its contacts and close them again when the zero line is next crossed, the curve gradually being moved further over to the positive side as a result of the repeated biassing of the field, until finally the curve remains wholly above the zero line. The relay will then hold its contacts closed until the machine pulls into synchronism when the curve will then indicate the steady D. C. voltage. Again even with a relatively large alteration in the field circuit, a second operation of the relay might be necessary, if the critical value of the beat frequency happened to occur, say, shortly before the point $A^5$ while the curve is moving rapidly downwards.

The invention may be carried into practice in various ways, but Figures 2–7 of the accompanying drawings respectively illustrate diagrammatically some alternative arrangements according thereto.

Figure 2:
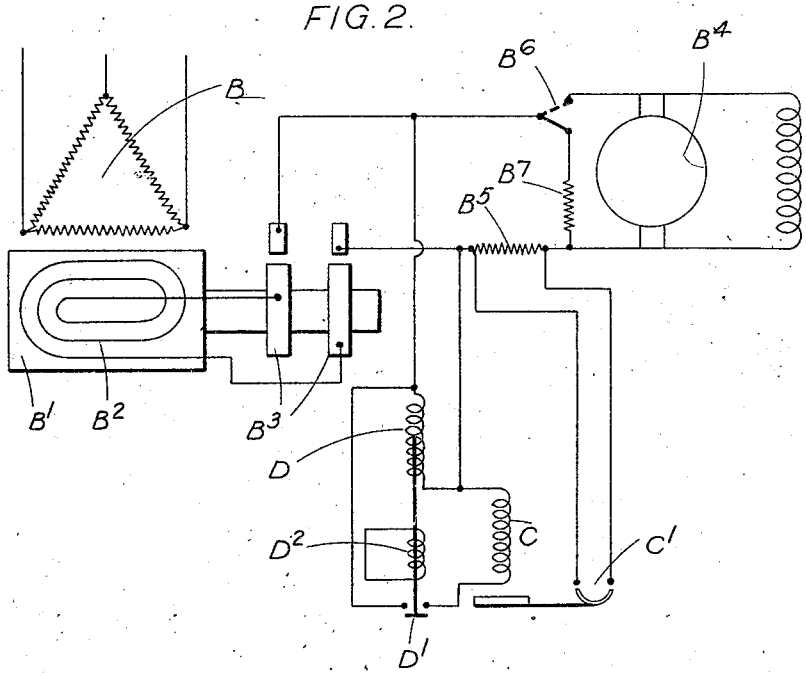

Figure 2 illustrates a simple form of the invention as applied to the starting and synchronizing of a synchronous induction motor, having a stator B and a rotor $B^1$ carrying field windings B² connected to slip rings B³. The field circuit of the machine is separately excited from a D. C. source indicated at B⁴, a resistance B⁵ being included in the field circuit or in the exciter circuit. The ends of this resistance are connected across the contacts C¹ of a polarized relay C, whose operating coil is connected through the contacts D¹ of a damped relay across the field circuit of the machine. The primary operating coil D of the damped relay is also connected across the field circuit, and this relay is provided with a short-circuited auxiliary winding D². The arrangement of the windings of the damped relay is such that it will not close its contacts D¹ until the periodicity of the pulsation or beat voltage, which is set up in the field circuit when the machine has been started up, has fallen to a predetermined value. When the beat frequency has fallen to this value the damped relay will close its contacts D¹ and thus complete the circuit to the polarized relay C. This relay C will then close its contacts C¹ as soon as the beat has the correct polarity and sufficient amplitude, thus short-circuiting the resistance B⁵. This has the effect of strengthening the field and thereby of increasing the forces tending to pull the machine into synchronism. The alteration of the field may be such that the beat retains the same polarity after a single operation of the relay C, and in this case the relay will not again open its contacts C¹, the machine meanwhile pulling into synchronism. If however the alteration of the field is insufficient for this the relay will open its contacts when the polarity of the beat changes and will close them again to give a further bias to the field. This action will be repeated until the beat is so far biassed as always to retain the same polarity, when the machine will pull into synchronism at the correct polarity.

Instead of, or in addition to, short-circuiting the resistance B⁵, the relay C may act to operate a field switch B⁶ thereby inserting the exciter B⁴ in series with the main field circuit B² which may up to this point have been either open-circuited or short-circuited through a resistance B⁷.

Figure 3:
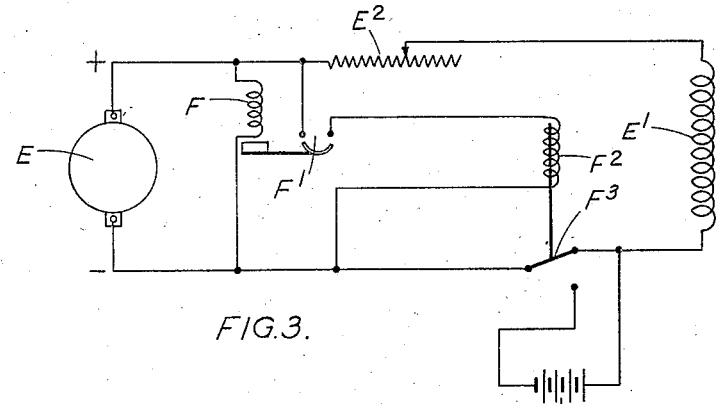
Figure 4:
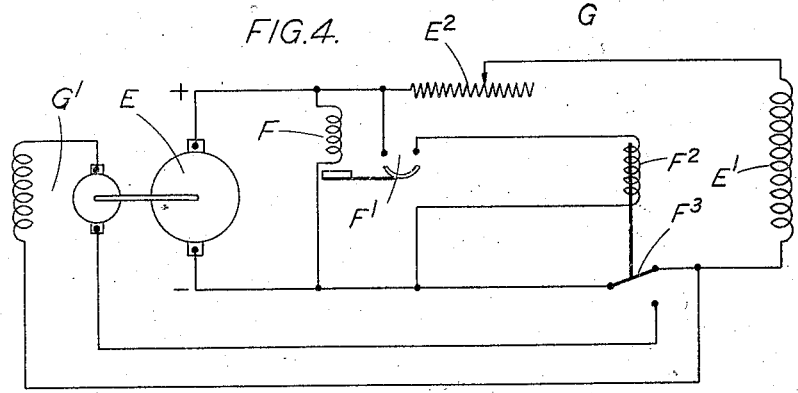

Figures 3 and 4 show alternative arrangements for biassing the field by means respectively of a storage battery and a series booster. In these figures part of an A. C. dynamo-electric machine (for example the rotor of a rotary converter) is indicated at E, with its field winding E¹ and field regulating resistance E². A polarized relay F is connected across the field circuit, this relay being itself damped (e. g. by means of a dashpot, magnetic brake or air vane not shown) so that it will not close its contacts F¹ until the beat set up in the field circuit has become sufficiently slow. The closing of the relay contacts F¹ completes a circuit across the field circuit of the machine to the operating coil F² of a contactor F³. In the case of Figure 3 this contactor F³ serves, when closed, to introduce a storage battery G in series with the field winding E¹, whilst in Figure 4 the contractor F³ introduces a booster G¹ driven by the rotor E (or alternatively by any other means) into the field circuit. In either case the battery G or booster G¹ acts to increase the amplitude of the beat in the correct direction sufficiently to enable the machine to pull into synchronism with the correct polarity. It will be understood that the biassing battery or booster is disconnected and normal connection is made when the usual running switch (not shown) is operated.

Figure 5:
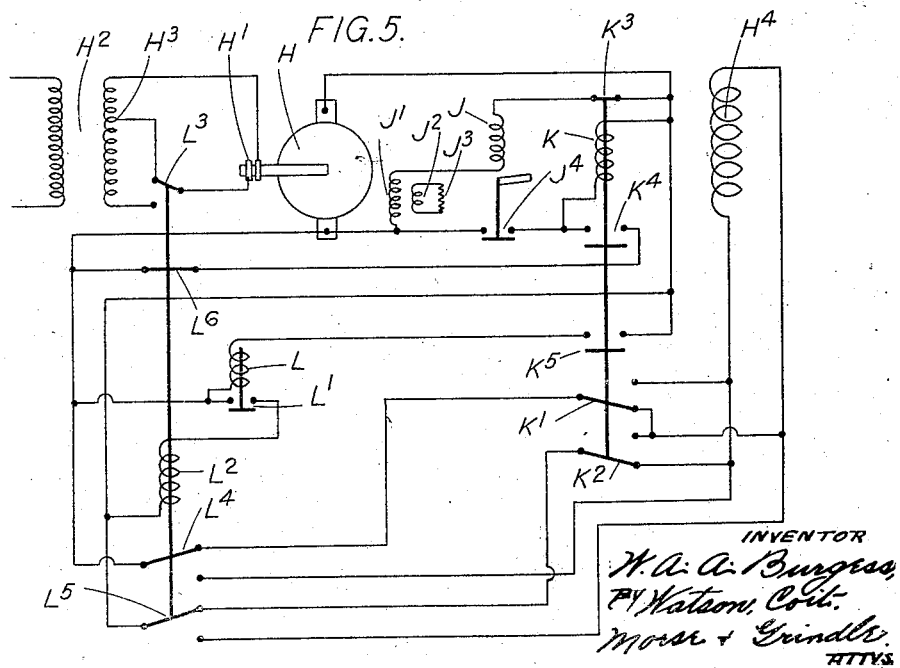

Figure 5 shows the application of the invention to a tap-started rotary converter, one phase only being shown on the A. C. side for the sake of clearness. The A. C. supply to the slip rings H¹ of the converter H is derived from a three-phase transformer H², each of whose low tension windings is provided with one (or more) tappings H³. Buffer resistances or other known devices for limiting the value of the A. C. current when full voltage is applied and also the usual short-circuiting switches are also omitted from the drawings for the sake of clearness. The main field winding H⁴ is reversed before starting, this being effected either automatically or by hand. With such a reversed field it is impossible for the machine to pull into step, but the amplitude of the beat set up in the field circuit will become sufficient on either side of the zero line to enable the desired polarity to be selected with certainty when the normal field connection is reverted to.

A polarity relay J is connected across the field circuit in series with the primary winding J¹ of a transformer, whose secondary winding J² is short-circuited by a resistance J³. This transformer J¹ J² is so arranged that it will act as a filter device to prevent the flow of sufficient current to operate the relay J unless the frequency of the beat is less than a predetermined value. Other forms of filter device, such as a choke coil, may be employed instead of the transformer J¹ J². The closing of the contacts J⁴ of the polarity relay J completes a circuit to the operating coil K of the field reversing contactors K¹ K². The coil K also controls three sets of auxiliary contacts K³ K⁴ K⁵, one of which K³ opens to break the circuit to the polarity relay J, whilst the second K⁴ closes to complete an alternative circuit to the coil K and thus make it independent of the polarity relay contacts J⁴. The contacts K⁴ are preferably arranged to close before the contacts K³ open. The third set of contacts K⁵ closes and completes the circuit to a normal voltage relay L, whose contacts $L^1$ in turn control the circuit to a motor or solenoid $L^2$ which serves to operate the running switches $L^3$ in the three phases and also auxiliary switches $L^4$ $L^5$ $L^6$. The auxiliary switches $L^4$ $L^5$ act when operated to connect the field winding $H^4$ directly across the machine field circuit and thereby render it independent of the reversing contactors $K^1$ $K^2$, whilst the auxiliary switch $L^6$ breaks the alternative circuit to the coil K.

The drawing shows the circuits in condition ready for starting and it will be noticed that the field winding $H^4$ is at this stage connected (through the reversing contactors $K^1$ $K^2$ and the auxiliary switches $L^4$ $L^5$) to the D. C. brushes of the machine in a sense opposite to that of normal running, thus ensuring that the machine cannot pull into synchronism. Alternating current at reduced voltage is now supplied to the converter slip rings $H^1$ through the transformer tappings $H^3$, and a beat voltage is consequently set up in the field circuit. When the beats have become slow enough the transformer $J^1$ $J^2$ will allow sufficient current to flow to operate the polarity relay J, but this relay will not actually close its contacts $J^4$ unless or until the polarity and amplitude of the beat are satisfactory. The closing of the contacts $J^4$ energizes the coil K, which breaks the circuit to the polarity relay J and makes its own circuit and at the same time operates the reversing contactors $K^1$ $K^2$ whereby the connections of the field winding $H^4$ are changed over from the reversed to the normal condition. The machine now pulls into synchronism and when the D. C. voltage has built up to the desired value, the relay L (the circuit to which was completed by the closing of the contacts $K^5$) closes its contacts $L^1$ and energizes the motor or solenoid $L^2$. The running switches $L^3$ are now transferred from their starting to their running positions, so that full voltage is supplied to the slip rings $H^1$, and the auxiliary switches $L^6$ $L^4$ $L^5$ are operated to cut out the coil K and to maintain the field winding $H^4$ in its normal connections independently of the reversing contactors $K^1$ $K^2$. If it should happen that the coil K is operated shortly before the beat polarity is about to change, the voltage may not build up quickly enough for the coil K to hold its contacts closed. In this case the contacts will open again and reinsert the polarity relay J. When the beat polarity changes back again the relay J will again operate and will energize the coil K sufficiently early to ensure the voltage building up satisfactorily, when the operations will continue as above described. It will be appreciated that means other than those described may be employed to transfer the field winding connections from the reversed to the normal condition at an appropriate time after starting operations have commenced.

Figure 6:
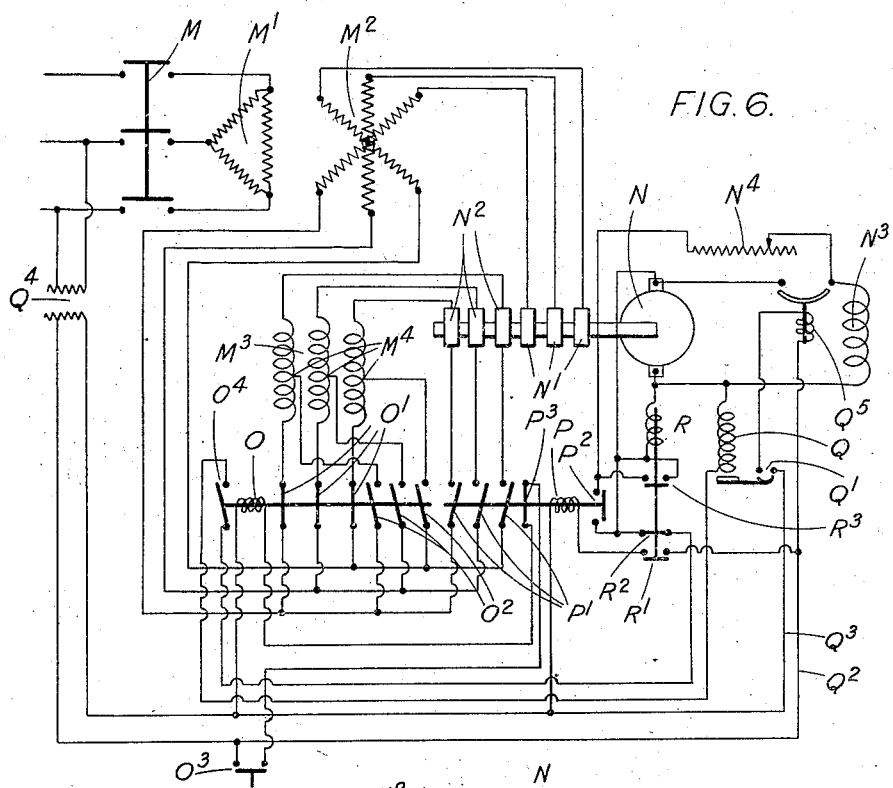
Figure 7:
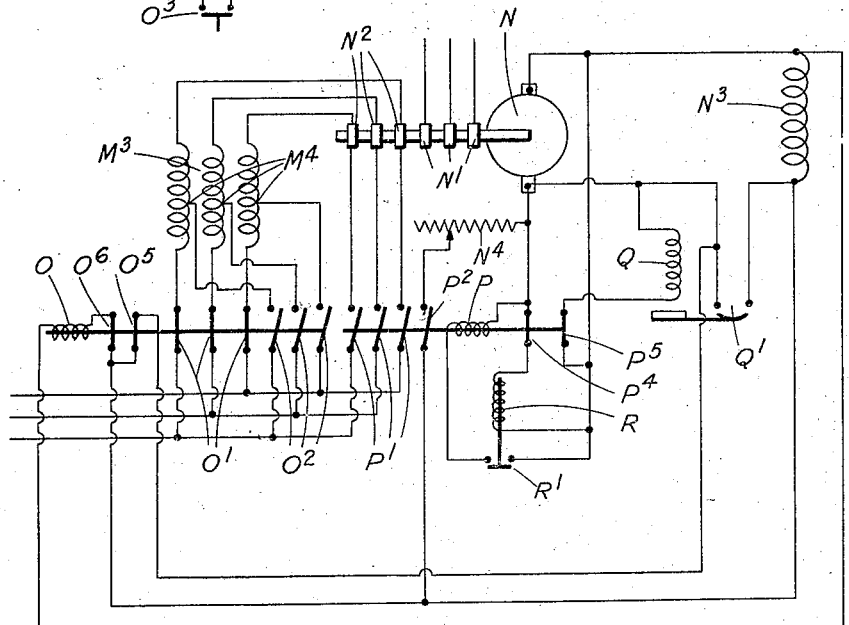

The arrangement of Figure 5 may also be employed with a rotary converter started by means of a small starting motor on the converter shaft. Figures 6 and 7 illustrate alternative arrangements in which a starting motor is employed, but it will be appreciated that these arrangements may also be used in the case of a tap-started or a reactance-started converter and also with a motor-started rotary converter of the well known Rosenberg type.

In the arrangement of Figure 6 the A. C. supply to the converter is connected through a main switch or circuit breaker M to the primary winding $M^1$ of a transformer. One pole of each phase of the secondary winding $M^2$ of this transformer is connected directly to a slip ring $N^1$ of a converter N, whilst the other three slip rings $N^2$ are connected to the ends of the windings of a starting motor $M^3$ having tappings $M^4$. The other ends of the windings of the starting motor are connected through starting switches $O^1$ controlled by a solenoid or motor O to the other poles of the transformer phase windings $M^2$, and the tappings $M^4$ and the slip rings $N^2$ are also connected to these phase windings respectively through starting switches $O^2$ controlled by the solenoid O and running switches $P^1$ controlled by a solenoid or motor P. The field winding $N^3$ of the converter is disconnected from the machine before starting, and (as will be described later) is connected thereto through a field regulating resistance $N^4$ when running.

Connected across the brushes of the converter is a polarity relay Q, which is so constructed that it will not close its contacts $Q^1$ until the beats set up in the armature are sufficiently slow and of sufficiently large amplitude and unless the polarity of the beat is correct. Alternatively, the polarity relay Q may be connected across the field circuit to operate by reason of the beat induced in this circuit by the pulsations in the armature circuit. The closing of the contacts $Q^1$ completes the circuit from control busbars $Q^2$ $Q^3$ (energized from a transformer $Q^4$ connected across one phase of the A. C supply circuit) or from a separate local source to a field contactor $Q^5$, the closing of whose contacts connects the field winding $N^3$ directly across the D. C. brushes of the machine. A normal voltage relay R is connected across the D. C. brushes of the machine and controls contacts $R^1$ $R^2$ $R^3$, one of which $R^1$ controls the supply circuit from the control busbars $Q^2$ $Q^3$ to the solenoid P, and the second $R^2$ controls the circuit to the polarity relay Q, whilst the third $R^3$ (which is preferably arranged to close before the contacts $R^2$ open)

provides an alternative supply to the field through the field regulating resistance $N^4$. The circuit from the brushes to the polarity relay Q may be taken directly through the contacts $R^2$, but as illustrated this circuit also includes an auxiliary switch $O^4$ operated by the starting switch solenoid O. The solenoid P controlling the running switches $P^1$ also operates two auxiliary switches $P^2$ $P^3$, one of which $P^2$ is in series with the field regulating resistance $N^4$, whilst the other $P^3$ is an interlock switch which controls together with a switch $O^3$ the circuit from the control busbars $Q^2$ $Q^3$ to the starting switch solenoid O.

The drawing shows all the circuits in condition ready for starting. When the machine is to be started up the main switch M is closed, and alternating current is supplied through the transformer $M^1$ $M^2$ to the slip rings $N^1$ $N^2$, the current to the slip rings $N^2$ passing through the closed starting switches $O^1$ and the full windings of the starting motor $M^3$. At a predetermined time after starting operations have commenced the switch $O^3$ is closed by appropriate means (not shown), and the solenoid O is thus energized to open the switches $O^1$ and to close the switches $O^2$ thus cutting out part of the motor windings. The energization of the solenoid O also causes the auxiliary switch $O^4$ to close and complete the circuit to the polarity relay Q.

In the armature (or alternatively the field) circuit of the machine a beat has meanwhile been set up, and as soon as the frequency, amplitude and polarity of the beat are satisfactory the polarity relay Q will close its contacts $Q^1$ and thus operate the field contactor $Q^5$ to connect the field winding $N^3$ to the D. C. brushes of the machine. This connection of a previously disconnected field winding to the brushes of the machine is equivalent to the short-circuiting of the resistance $B^5$ in Figure 2 if this resistance be taken as infinite. The connection of the field winding $N^3$ to the machine enables the machine to pull into synchronism, although as has been explained with reference to the contactor K in Figure 3 a second operation of the polarity relay may be necessary under certain circumstances. When synchronism has been attained and the D. C. voltage has built up to the desired value, the normal voltage relay R will be operated. The opening of the contacts $R^2$ deenergizes the polarity relay Q and thereby causes the contactor $Q^5$ to open its contacts, but before this takes place the alternative circuit to the field through the regulating resistance $N^4$ has been completed by the closing of the contacts $R^3$, this resistance $N^4$ being set for normal no-load voltage. The closing of the contacts $R^1$ completes the circuit to the solenoid P which thereupon closes the running switches $P^1$ and also operates the auxiliary switches $P^2$ $P^3$. The opening of the interlock switch $P^3$ deenergizes the solenoid O which operates the starting switches, the slip rings $N^2$ being now connected directly to the transformer secondary $M^2$ through the running switches $P^1$. The closing of the auxiliary switch $P^2$ provides an alternative connection to the regulating resistance $N^4$ rendering it independent of the normal volts relay R which may if desired be deenergized. The machine is now fully connected up in its running condition and is ready to take the load on the D. C. side.

Fig. 7 shows a modified form of the arrangement of Figure 6 in which a D. C. supply from the machine itself is first used to operate the starting switch gear and to open the field circuit, in order to prevent the machine from automatically synchronizing with the wrong polarity before the polarity relay could operate.

In this arrangement the A. C. connections to the converter are identical with those shown in Figure 6 and the same reference letters are employed, parts of these circuits being omitted for the sake of clearness. The solenoids O and P which respectively control the starting and running switches $O^1$ $O^2$ and $P^1$ now derive their current from the brushes of the machine and consequently the control busbars are dispensed with, the polarity relay Q itself acting directly as field contactor. In this case, however, the solenoid or motor P operates two further auxiliary switches $P^4$ $P^5$, which are arranged to open shortly after the auxiliary switch $P^2$ closes. The switches $P^4$ and $P^5$ respectively control the circuits from the brushes to the normal voltage relay R (whose contacts $R^1$ control the circuit to the solenoid P) and to the polarity relay Q. The solenoid or motor O also operates two auxiliary switches $O^5$ $O^6$, one of which $O^5$ is connected in parallel with the contacts $Q^1$ of the polarity relay, whilst the other $O^6$ is connected in the supply circuit to the solenoid O.

The circuits are shown in condition ready for starting, and it will be noticed that in this case the field winding $N^3$ is connected at starting to the D. C. brushes of the machine through the auxiliary switch $O^5$. When the machine is started up, alternating current is supplied directly to the slip rings $N^1$ and through the windings of the starting motor $M^3$ to the slip rings $N^2$. The D. C. voltage begins to build up in the field circuit of the machine due to the residual magnetic field, and when it reaches a predetermined value it operates the solenoid O, which is connected directly across the brushes through the switch $O^6$. The starting switches $O^1$ now open and the switches $O^2$ close thereby cutting out part of the starting motor windings. At the same time the auxiliary switch $O^5$ opens and disconnects the field winding $N^3$ from the machine brushes, whilst the opening of the switch $O^6$ deenergizes the solenoid O. The machine now runs up to subsynchronous speed, and when the beat in the field circuit reaches the predetermined frequency, amplitude and polarity, the polarity relay Q closes its contacts $Q^1$ and again connects the field winding $N^3$ to the machine brushes. The machine now pulls into synchronism with the correct polarity, and when the D. C. voltage builds up to the desired value, the normal voltage relay R operates to energize the solenoid P. The solenoid P closes the running switches $P^1$, thus connecting all the machine slip rings direct to the supply transformer, and deenergizes the relays Q and R having first provided an alternative supply to the field through the field regulating resistance $N^4$. The machine is now in its correct running condition.

It will be appreciated that the various alternative above described have been given by way of example only and that the invention may be carried into practice in other ways and may be applied to the starting and synchronizing not only of synchronous induction motors and rotary converters but of motor converters and other A. C. dynamo-electric machines.

What I claim as my invention and desire to secure by Letters Patent is:—

1. In starting and synchronizing apparatus for an A. C. dynamo-electric machine, the combination with the main field winding of the machine whose connections to the machine terminals are reversed when starting operations commence, of an A. C. supply circuit for the machine, a D. C. circuit associated with the field of the machine, a polarized relay connected to the D. C. circuit and responsive to the beat between the supply voltage and the voltage of the machine, means for preventing operation of the relay until the frequency of the beat has fallen to a predetermined value, and means whereby the field connections are brought into their normal condition when the relay operates.

2. In starting and synchronizing apparatus for an A. C. dynamo-electric machine, the combination with the main field winding of the machine whose connections to the machine terminals are reversed when starting operations commence, of an A. C. supply circuit for the machine, a D. C. circuit associated with the field of the machine, a relay connected to the D. C. circuit and responsive to the beat between the supply voltage and the voltage of the machine, the relay being directionally biassed so that it will alternately close and open its contacts when the polarity of the beat changes, means for preventing operation of the relay until the frequency of the beat has fallen to a predetermined value, and means whereby each closing of the relay contacts causes the field connections to be brought into their normal condition.

3. In starting and synchronizing apparatus for a dynamo-electric machine for converting A. C. energy into D. C. energy, the combination with the machine field winding whose connections to the machine D. C. terminals during starting operations are in a condition other than that necessary for synchronizing, of a polarized relay so arranged and so connected to the machine D. C. terminals that it will first close its contacts when the beat between the supply voltage and the voltage of the machine is sufficiently slow and will thereafter alternately open and close its contacts when the polarity of the beat changes, and means whereby each closing of the relay contacts causes an alteration to be made in the field circuit and thereby increases the forces tending to pull the machine into synchronism at the correct polarity.

4. In starting and synchronizing apparatus for a dynamo-electric machine for converting A. C. energy into D. C. energy, the combination with the machine field winding whose connections to the machine D. C. terminals are reversed during starting operations whereby the machine is prevented from pulling into synchronism, of a relay so arranged and so connected to the machine D. C. terminals as to be operative when the beat between the supply periodicity and the periodicity corresponding to the actual speed of the machine is sufficiently slow, and means whereby the field connections are brought into their correct synchronizing condition when the relay operates.

5. In starting and synchronizing apparatus for a dynamo-electric machine for converting A. C. energy into D. C. energy, the combination with the machine field winding whose connections to the machine D. C. terminals are reversed during starting operations whereby the machine is prevented from pulling into synchronism, of a polarized relay connected across the machine D. C. terminals and responsive to such portions of the beat between the supply voltage and the voltage of the machine as have the same polarity, a damping device separate from the polarized relay and controlling the operating circuit thereto whereby the operation of the relay is prevented until the frequency of the beat has fallen to a predetermined value, and means whereby the field connections are brought into their correct synchronizing condition when the relay operates.

6. The combination with the features set out in claim 4, of a further relay which operates its contacts when synchronism is attained, and means whereby such further relay brings the field circuit and the supply circuit of the machine into their correct running conditions.

7. In starting and synchronizing apparatus for a dynamo-electric machine for converting A. C. energy into D. C. energy, the combination with the machine field winding whose connections to the machine D. C. terminals during starting operations are in a condition other than that necessary for synchronizing, of a relay so arranged and so connected to the machine D. C. terminals as to be operative when the beat between the supply periodicity and the periodicity corresponding to the actual speed of the machine is sufficiently slow, means whereby the operation of the relay is caused to bring the field connections into their correct synchronizing condition, a further relay which operates its contacts when synchronism is attained, and means whereby such further relay brings the field circuit and the supply circuit of the machine into their correct running conditions.

8. In starting and synchronizing apparatus for a dynamo-electric machine for converting A. C. energy into D. C. energy, the combination with the machine field winding whose connections to the machine D. C. terminals during starting operations are in a condition other than that necessary for synchronizing, of a polarized relay connected across the machine D. C. terminals and responsive to such portions of the beat between the supply voltage and the voltage of the machine as have the same polarity, means for preventing operation of the relay until the frequency of the beat has fallen to a predetermined value, means whereby the operation of the relay is caused to bring the field connections into their correct synchronizing condition, a further relay which operates its contacts when synchronism is attained, and means whereby such further relay brings the field circuit and the supply circuit of the machine into their correct running conditions.

9. In starting and synchronizing apparatus for a dynamo-electric machine for converting A. C. energy into D. C. energy, the combination with the machine field winding whose connections to the machine D. C. terminals during starting operations are in a condition other than that necessary for synchronizing, of a relay so connected to the machine D. C. terminals as to be responsive to the beat between the supply voltage and the voltage of the machine, the relay being directionally biassed so that it will alternately close and open its contacts when the polarity of the beat changes, damping means separate from the relay and controlling the operating circuit thereto whereby the relay cannot operate its contacts until the frequency of the beat has fallen to a predetermined value, means whereby each operation of the relay acts to bring the field connections into their correct synchronizing condition, a further relay which operates its contacts when synchronism is attained, and means whereby such further relay brings the field circuit and the supply circuit of the machine into their correct running conditions.

In testimony whereof I have signed my name to this specification.

WILLIAM ANTHONY AMBROSE BURGESS.